(12) United States Patent
Zhou et al.

(10) Patent No.: US 8,594,067 B2
(45) Date of Patent: Nov. 26, 2013

(54) MULTIPLE ACCESS METHOD AND SYSTEM OF TERMINAL IN EVOLVED PACKET SYSTEM

(75) Inventors: Xiaoyun Zhou, Shenzhen (CN); Yifeng Bi, Shenzhen (CN); Fei Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 47 days.

(21) Appl. No.: 13/259,769

(22) PCT Filed: Sep. 23, 2009

(86) PCT No.: PCT/CN2009/074159
§ 371 (c)(1),
(2), (4) Date: Dec. 22, 2011

(87) PCT Pub. No.: WO2010/148597
PCT Pub. Date: Dec. 29, 2010

(65) Prior Publication Data
US 2012/0113968 A1 May 10, 2012

(30) Foreign Application Priority Data
Jun. 23, 2009 (CN) .......................... 2009 1 0150257

(51) Int. Cl.
*H04W 4/00* (2009.01)
*H04L 12/28* (2006.01)
*G06F 15/16* (2006.01)

(52) U.S. Cl.
USPC ........................... 370/338; 370/401; 709/227

(58) Field of Classification Search
None
See application file for complete search history.

(56) References Cited

U.S. PATENT DOCUMENTS

| | | | |
|---|---|---|---|
| 7,298,751 B1 * | 11/2007 | Baker et al. | 370/401 |
| 7,768,958 B1 * | 8/2010 | Baker et al. | 370/328 |
| 8,150,397 B2 * | 4/2012 | Khetawat et al. | 455/436 |
| 2008/0076419 A1 * | 3/2008 | Khetawat et al. | 455/435.1 |
| 2010/0009675 A1 * | 1/2010 | Wijting et al. | 455/426.1 |
| 2010/0080172 A1 * | 4/2010 | Jin et al. | 370/328 |
| 2010/0142399 A1 * | 6/2010 | Hu et al. | 370/252 |

FOREIGN PATENT DOCUMENTS

| | | |
|---|---|---|
| CN | 101325583 A | 12/2008 |
| CN | 101442744 A | 5/2009 |
| CN | 101447918 A | 6/2009 |
| WO | WO-2008/099254 A2 | 8/2008 |

OTHER PUBLICATIONS

International Search Report with English Translation issued in PCT/CN2009/074159 dated Mar. 25, 2010.
"Multi Access PDN Connectivity: Scenarios, Issues and Proposed Solutions" 3GPP TSG 5A WG2 Meeting #70, Phoenix, USA, Jan. 12-16, 2009, Japanese Office Action dated May 14, 2013 (May 14, Heisei 25).

* cited by examiner

*Primary Examiner* — Clemence Han
(74) *Attorney, Agent, or Firm* — Venable LLP; Robert S. Babayi; Thomas A. Negley

(57) ABSTRACT

The present invention discloses a multiple access method and a multiple access system of terminal in Evolved Packet System (EPS). The multiple access method of terminal in EPS comprises the following steps that: a Packet Data Network Gateway (P-GW) sends a first multiple access capability indication to a terminal, wherein the first multiple access capability indication denotes that the P-GW supports a multiple access; the terminal performs the multiple access according to the multiple access capability indication of the P-GW. The present invention avoids the waste of network resource and improves the experience of users.

19 Claims, 5 Drawing Sheets

MULTIPLE ACCESS METHOD AND SYSTEM OF TERMINAL IN EVOLVED PACKET SYSTEM

TECHNICAL FIELD OF THE INVENTION

The present invention relates to the communication field, and in particular to a multiple access method and a multiple access system of terminal in evolved packet system.

BACKGROUND OF THE INVENTION

As shown in FIG. 1, an Evolved Packet System (EPS) consists of an access network and an Evolved Packet Core (EPC) network, wherein the access network can be an Evolved Universal Terrestrial Radio Access Network (E-UTRAN) and the like; the EPC comprises a Mobility Management Entity (MME), a Serving Gateway (S-GW), a Packet Data Network Gateway (P-GW), a Home Subscriber Server (HSS), a 3GPP Authentication Authorization Accounting server (3GPP AAA server), a Policy and Charging Rules Function (PCRF) and other support nodes.

In which, the MME is responsible for the control plane related work including mobility management, non-access layer signaling process and user context management and so on; the S-GW is an access gateway equipment connected with the E-UTRAN, which is responsible for forwarding data between the E-UTRAN and the P-GW and caching the paging waiting data; the P-GW is a boundary gateway of 3GPP evolved packet system and Packet Data Network (PDN), which is responsible for performing the access of user terminal to PDN and forwarding data between the EPS and the PDN and so on; the PCRF is a policy and charging rule function entity which is connected with an operator Internet Protocol (IP) service network via a receiving interface Rx to obtain service information; and furthermore, the PCRF is connected with the gateway equipments in network via Gx/Gxa/Gxc interfaces, which is responsible for initializing an IP bearer establishment to guarantee the Quality of Service (QoS) of the service data and perform the charging control.

The EPS also supports the accesses of UE by the other non-3GPP systems besides the E-UTRAN, wherein the access of non-3GPP system is realized via an S2$a/b/c$ interface and the P-GW is used as a data anchor point of the access of 3GPP system and the access of non-3GPP system. In the system architecture of EPS, non-3GPP system includes a trusted non-3GPP IP access network and an untrusted non-3GPP IP access network, in which, the trusted non-3GPP IP access network can be connected with P-GW directly via an S2$a$ interface, and the untrusted non-3GPP IP access network can be connected with P-GW via an evolved packet data gateway (ePDG), wherein the interface between the ePDG and the P-GW is S2$b$. S2$c$ is an interface between an User Equipment (UE) and the P-GW, applying the mobile IPv6 support for Dual Stack Hosts and Routers (DSMIPv6) protocol to provide control and mobility management.

At present, multiple access becomes one of the research subjects of the EPS. Multiple access means that EPC supports the simultaneous access of UE, through multiple access networks, to one or more PDNs via the same P-GW or different P-GWs. As shown in FIG. 2, UE is under the coverage of the non-3GPP access network and the 3GPP access network simultaneously, and accesses through the non-3GPP IP access network and the 3GPP access network, to the same PDN via the same P-GW. In this case, the UE attaches to the EPC through a plurality of access networks; P-GW allocates an IP address for UE; and a PDN connection exists between UE and PDN. Since different services require different network transmissions, a proper access network can be selected to transmit services according to the characteristics of the services with the multiple access technology, moreover a plurality of access networks can share network load, thereby network congestion is avoided. For example, when the non-3GPP access network is WiFi, the service data flow of Http and Ftp can be sent to UE through the WiFi access network and the service data flow of VoIP can be sent to UE through the 3GPP.

With the multiple access mothed and the multiple access system of EPS based on the related art, in the condition that the selected P-GW does not support a multiple access when UE performs an initial attachment, the P-GW cannot identify the multiple access request initialized by the UE, which does not know whether or not the P-GW supports the multiple access and defaults that the P-GW supports the multiple access. Therefore the UE still initializes a multiple access request, which resulting in a waste of network resource and a poor experience of users. For above problems existing in the prior art, no effective solution has been provided by far.

SUMMARY OF THE INVENTION

A management method and a management system for supporting a multiple access terminal in EPS are provided in the present invention, which are used for solving the technical problems in the related art that network resource is wasted and user experience is poor because a UE does not know whether or not P-GW supports a multiple access.

According to one aspect of the invention, a multiple access method of terminal in EPS is provided.

The multiple access method of terminal in the EPS according to the invention comprises: sending a first multiple access capability indication to a terminal by a P-GW, wherein the first multiple access capability indication denotes that the P-GW supports a multiple access; and performing the multiple access by the terminal according to the multiple access capability indication of the P-GW.

Preferably, before the step of sending the first multiple access capability indication to a terminal by the P-GW, the method further comprises: sending a second multiple access capability indication to the P-GW by the terminal, wherein the second multiple access capability indication denotes that the terminal supports a multiple access.

Preferably, the step of sending the first multiple access capability indication to the terminal by the P-GW comprises: sending a bearer establishment request or a proxy binding update to the P-GW by an S-GW; allocating a network protocol address for the terminal and returning a bearer establishment response or a proxy binding confirmation to the S-GW by the P-GW, wherein the bearer establishment response or the proxy binding confirmation carries the first multiple access capability indication denoting whether or not the P-GW supports the multiple access; and forwarding the first multiple access capability indication to the terminal by the S-GW.

Preferably, the step of sending the first multiple access capability indication to the terminal by the P-GW comprises: sending a proxy binding updating request to the P-GW by a trusted non-3GPP access gateway; allocating a network protocol address for the terminal by the P-GW; returning, by the P-GW, to the trusted non-3GPP access gateway a proxy binding confirmation that carries the network protocol address of the terminal and the first multiple access capability indication; and forwarding the first multiple access capability indication to the terminal by the trusted non-3GPP access gateway.

Preferably, the step of sending the first multiple access capability indication to the terminal by the P-GW comprises: sending a proxy binding updating request to the P-GW by the ePDG; allocating a network protocol address for the terminal by the P-GW; returning, by the P-GW, to the ePDG a proxy binding confirmation that carries the network protocol address of the terminal and the first multiple access capability indication; and forwarding the first multiple access capability indication to the terminal by the ePDG.

Preferably, the multiple access method above further comprises the step of: while sending the first multiple access capability indication to the terminal, sending to the terminal a mobility management protocol type supported by the P-GW.

Preferably, the multiple access method above further comprises the steps of: not sending the first multiple access capability indication to a terminal by the P-GW if the P-GW does not support the multiple access; and not performing the multiple access by the terminal.

Preferably, in the method above, the first multiple access capability indication and the second multiple access capability indication are packaged in a protocol configuration option to send to the terminal.

According to another aspect of the invention, a multiple access system of terminal in EPS is provided.

The multiple access system of terminal in EPS according to the invention comprises: a P-GW, configured to send a first multiple access capability indication to a terminal and accomplish the multiple access of the terminal, wherein the first multiple access capability indication denotes that the P-GW supports a multiple access; and an access module, configured to perform the multiple access according to the first multiple access capability indication.

Preferably, the access module is further configured to send to the P-GW a second multiple access capability indication which denotes that the terminal supports the multiple access.

Preferably, the P-GW is further configured to send to the terminal a mobility management protocol type supported by P-GW.

Preferably, the first multiple access capability indication and the second multiple access capability indication are packaged in a protocol configuration option to send to the terminal.

According to at least one technical scheme above according to the invention, a multiple access capability indication of P-GW denoting that the P-GW supports a multiple access is sent to a terminal, and then the terminal, according to the multiple access capability indication, performs the multiple access, which result in that the terminal will not send a multiple access request to P-GW in the condition that P-GW does not support the multiple access, and thereby the technical effects of avoiding the waste of network resource and improving the experience of users are achieved.

BRIEF DESCRIPTION OF THE DRAWINGS

Accompanying drawings described hereinafter are provided to constitute one part of the specification for a further understanding of this invention. The exemplary embodiments and the description thereof are used to explain the present invention without unduly limiting the scope of the present invention, wherein.

DETAILED DESCRIPTION OF THE INVENTION

The preferred embodiments of the invention are described hereafter in combination with the drawings. It should be understood that the preferred embodiment described below are only used to describe and illustrate but not to limit this invention.

In the following description, several specific details are described below to provide a thorough understanding of the invention for the purpose of illustrating. However, this invention also can be implemented without these specific details obviously. Furthermore, if no conflict exists, that is, no departing from the spirit and scope of the claims exist, various combinations of the embodiments below and the details therein can be made.

Embodiment 1

Figure 1:
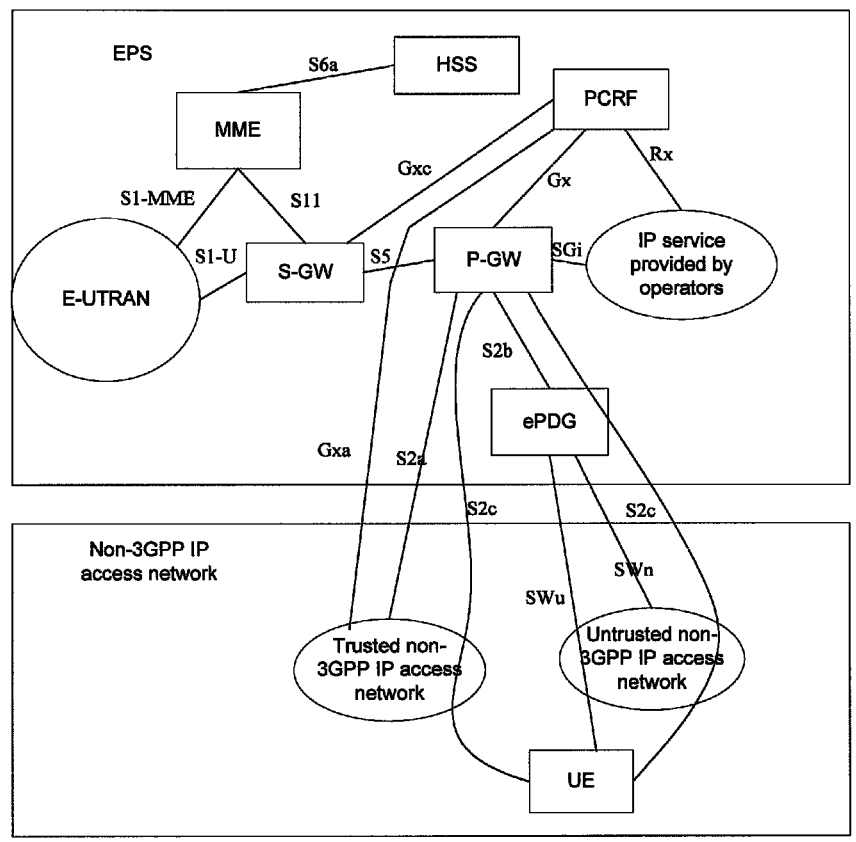
FIG. 1 shows a schematic diagram of the system architecture of EPS in the prior art.
Figure 2:
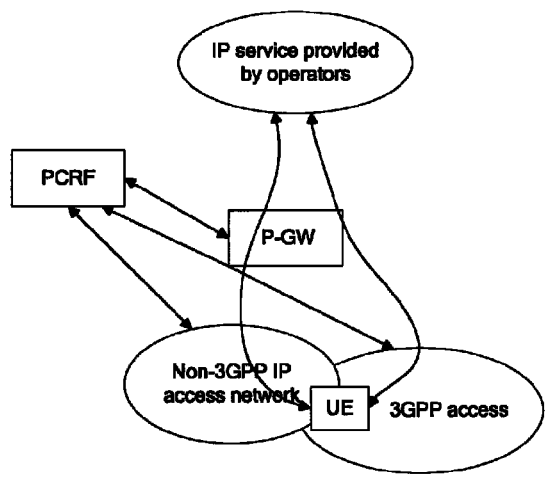
FIG. 2 shows a schematic diagram of a multiple access of terminal in the prior art.
Figure 3:
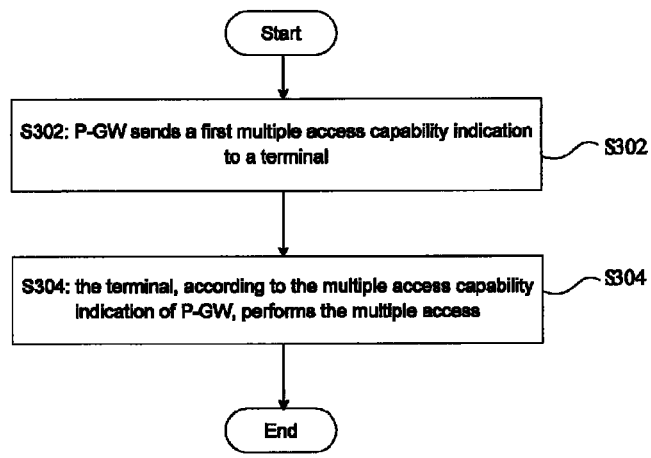
FIG. 3 shows a flow chart of a multiple access method of terminal in EPS according to the first embodiment of the invention.

FIG. 3 shows a flow chart of a multiple access method of terminal in EPS according to the first embodiment of the invention. As shown in FIG. 3, the multiple access method of terminal in EPS according to the first embodiment of the invention comprises the following steps:

S302: an P-GW sends a first multiple access capability indication to a terminal, wherein the first multiple access capability indication denotes that the P-GW supports a multiple access;

S304: the terminal performs the multiple access according to the multiple access capability indication of the P-GW.

In terms of the multiple access method of terminal in EPS according to the first embodiment of the invention, a multiple access capability indication of P-GW denoting that the P-GW supports a multiple access is sent to a terminal, and then the terminal, according to the multiple access capability indication, performs the multiple access, which result in that the terminal will not send a multiple access request to the P-GW in the condition that P-GW does not support the multiple access, and thereby the technical effects of avoiding the waste of network resource and improving the experience of users are achieved.

Preferably, before the step that the P-GW sends the first multiple access capability indication to the terminal, the method further comprises the steps that: the terminal sends to the P-GW a second multiple access capability indication which denotes that the terminal supports the multiple access. Therefore, the P-GW can know whether or not the terminal supports the multiple access and returns to the terminal its own multiple access capability indication according to whether or not the terminal supports the multiple access, so that both UE and P-GW can know each other's multiple access capability finally.

Preferably, the step that the P-GW sends the first multiple access capability indication to the terminal specifically comprises the following steps that: an S-GW sends to the P-GW a bearer establishment request or a proxy binding update; the P-GW allocates a network protocol address for the terminal and returns to the S-GW a bearer establishment response or a proxy binding confirmation that carries the first multiple access capability indication denoting whether or not the P-GW supports a multiple access; and the S-GW forwards the first multiple access capability indication to the terminal, thereby achieving a purpose that the P-GW notifies the UE of its multiple access capability when the UE accesses to EPC through E-UTRAN.

Preferably, the step that the P-GW sends the first multiple access capability indication to a terminal specifically comprises the following steps that: a trusted non-3GPP access gateway sends a proxy binding updating request to the P-GW; the P-GW allocates a network protocol address for the terminal; the P-GW returns to the trusted non-3GPP access gateway a proxy binding confirmation that carries the network protocol address of the terminal and the first multiple access capability indication; and the trusted non-3GPP access gateway forwards the first multiple access capability indication to the terminal. Thereby a purpose that the P-GW notifies the UE of its multiple access capability when the UE accesses to EPC through the trusted 3GPP access network is achieved.

Preferably, the step that the P-GW sends the first multiple access capability indication to the terminal specifically comprises the following steps that: the evolved P-GW sends to the P-GW a proxy binding updating request; the P-GW allocates a network protocol address for the terminal; the P-GW returns to the evolved P-GW a proxy binding confirmation that carries the network protocol address of the terminal and the first multiple access capability indication; and the ePDG forwards the first multiple access capability indication to the terminal. Thereby a purpose that P-GW notifies UE of its multiple access capability when UE accesses to EPC through an untrusted 3GPP access network is achieved.

Preferably, the multiple access method above further comprises the step of: while sending the first multiple access capability indication to the terminal, sending to the terminal a mobility management protocol type supported by the P-GW. In the prior art, the UE cannot know the mobility management protocol supported by the P-GW when accessing through 3GPP; the UE can know the mobility management protocol supported by P-GW only when selecting the mobility management protocol after the UE decides to initialize the multiple access. If the capabilities of the UE and the P-GW are different, the UE can only terminate the multiple access flow. Therefore, the process of sending to the terminal the mobility management protocol type supported by the P-GW while sending the multiple access capability indication of the P-GW to the terminal can make the UE know the mobility management protocol supported by the P-GW, thereby avoiding the waste of network resource and improving the experience of users.

Preferably, the multiple access method above further comprises the steps that: if the P-GW does not support the multiple access, the P-GW does not send the first multiple access capability indication to the terminal; and the terminal does not perform the multiple access. Thereby a purpose of managing the multiple access service of the UE according to whether or not the P-GW supports a multiple access is achieved.

Preferably, the first multiple access capability indication and the second multiple access capability indication are packaged in a protocol configuration option to send to the terminal, thereby reducing the influence to the access network element as far as possible.

In terms of the multiple access method of terminal in EPS according to the first embodiment of the invention, a multiple access capability indication of P-GW denoting that the P-GW supports a multiple access and a mobility management protocol type supported by the P-GW are sent to a terminal, and then the terminal, according to the multiple access capability indication, performs the multiple access, which result in that the terminal will not send a multiple access request to the P-GW in the condition that the P-GW dose not support the multiple access, and thereby the technical effects of avoiding the waste of network resource and improving the experience of users are achieved.

Embodiment 2

Figure 4:
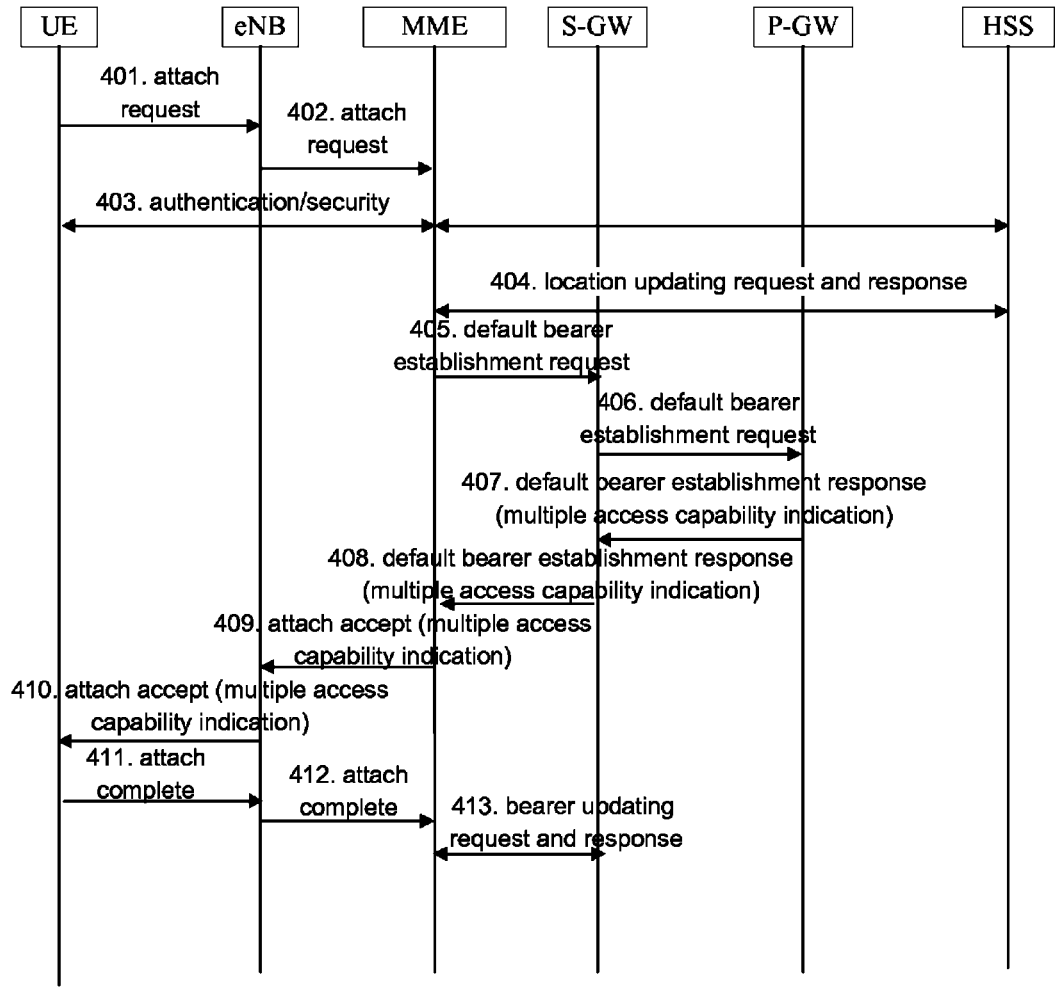
FIG. 4 shows a flow chart of a multiple access method of terminal in EPS when a UE accesses to EPC through E-UTRAN according to the second embodiment of the invention.

FIG. 4 shows a flow chart of a multiple access method of terminal in EPS when a UE accesses to EPC through E-UTRAN according to the second embodiment of the invention. In FIG. 4, a P-GW notifies a UE of its multiple access capability, wherein the P-GW supports a multiple access, a GTP protocol is applied between S-GW and P-GW.

As shown in FIG. 4, the multiple access method of terminal in EPS according to the second embodiment of the invention comprises the following steps that:

S401: the UE sends to a eNodeB an attach request message, for requesting to access to EPS;

S402: the eNodeB sends to MME an attach request message;

S403: the network performs authentication to the UE and starts Network Attached Storage (NAS) security encrypted protection;

S404: after the authentication is passed, the MME interacts with HSS and performs a location update flow;

S405: the MME, according to the default APN signed up by a subscriber, selects a P-GW for the UE, and after selecting an S-GW sends to the S-GW a default bearer establishment request message;

S406: the S-GW sends to the selected P-GW a default bearer establishment request message;

S407: the P-GW, after allocating an IP address for the UE access, returns to the S-GW a default bearer establishment response message. Since the P-GW supports a multiple access, the P-GW carries a multiple access capability indication in the returned message;

S408: the S-GW returns to the MME the default bearer establishment response message in which a multiple access capability indication is carried;

S409: the MME returns to the eNodeB an attach accept message in which a multiple access capability indication is carried;

S410: the eNodeB returns to the UE an attach accept message in which a multiple access capability indication is carried, and then the UE knows the multiple access capability of P-GW;

S411: the UE sends to the eNodeB an attach complete message;

S412: the eNodeB sends to the MME an attach complete message;

S413: the MME and the S-GW perform interactive process about bearer update.

In S401, when the UE sends an attach request message, a multiple access capability indication can be carried therein to notify the P-GW that the UE supports a multiple access. The P-GW, according to the multiple access capability indication message sent by the UE, determines whether or not to carry a multiple access capability indication in S407.

In S407, the P-GW also can return to the UE the supported mobility management protocol type when the UE accesses through non-3GPP. For example, if the P-GW supports DSMIPv6, then the P-GW carries a multiple access capability indication and a DSMIPv6 supported indication in S407; if the P-GW supports PMIPv6, then the P-GW carries a multiple access capability indication and a PMIPv6 supported indication in S407.

In the following S408, S409 and S410, a corresponding indication message will also be carried to notify the UE. After knowing the multiple access capability of the P-GW, the UE determines whether or not to initialize a multiple access service request.

In order to reduce the influence to access network elements as far as possible, the P-GW can package the multiple access capability indication and/or the supported mobility management type indication in PCO to send to the UE, and the UE also can package its multiple access capability indication in PCO to send to the P-GW.

When the UE accesses to EPC through E-UTRAN, in the condition that PMIPv6 protocol is applied between the S-GW and the P-GW, the flow that the P-GW notifies the UE that the P-GW has multiple access capability is similar to the above. The difference is that: in S406, the S-GW sends to the P-GW a proxy binding updating message; in S407, the P-GW returns to the S-GW a proxy binding confirmation message in which the P-GW carries a multiple access capability indication and/or a supported mobility management type indication.

In terms of the multiple access method of terminal in EPS when the UE accesses to EPC through E-UTRAN according to the second embodiment of the invention, a multiple access capability indication of the P-GW denoting whether or not the P-GW supports a multiple access and mobility management protocol type supported by the P-GW are sent to the terminal; then a management for the multiple access service of terminal is performed according to the multiple access capability indication, so that the terminal will not send a multiple access request to the P-GW in the condition that the P-GW does not support a multiple access and the UE can know the mobility management protocol type supported by the P-GW, thereby achieving the technical effects of avoiding the waste of network resource and improving the experience of users.

Embodiment 3

Figure 5:
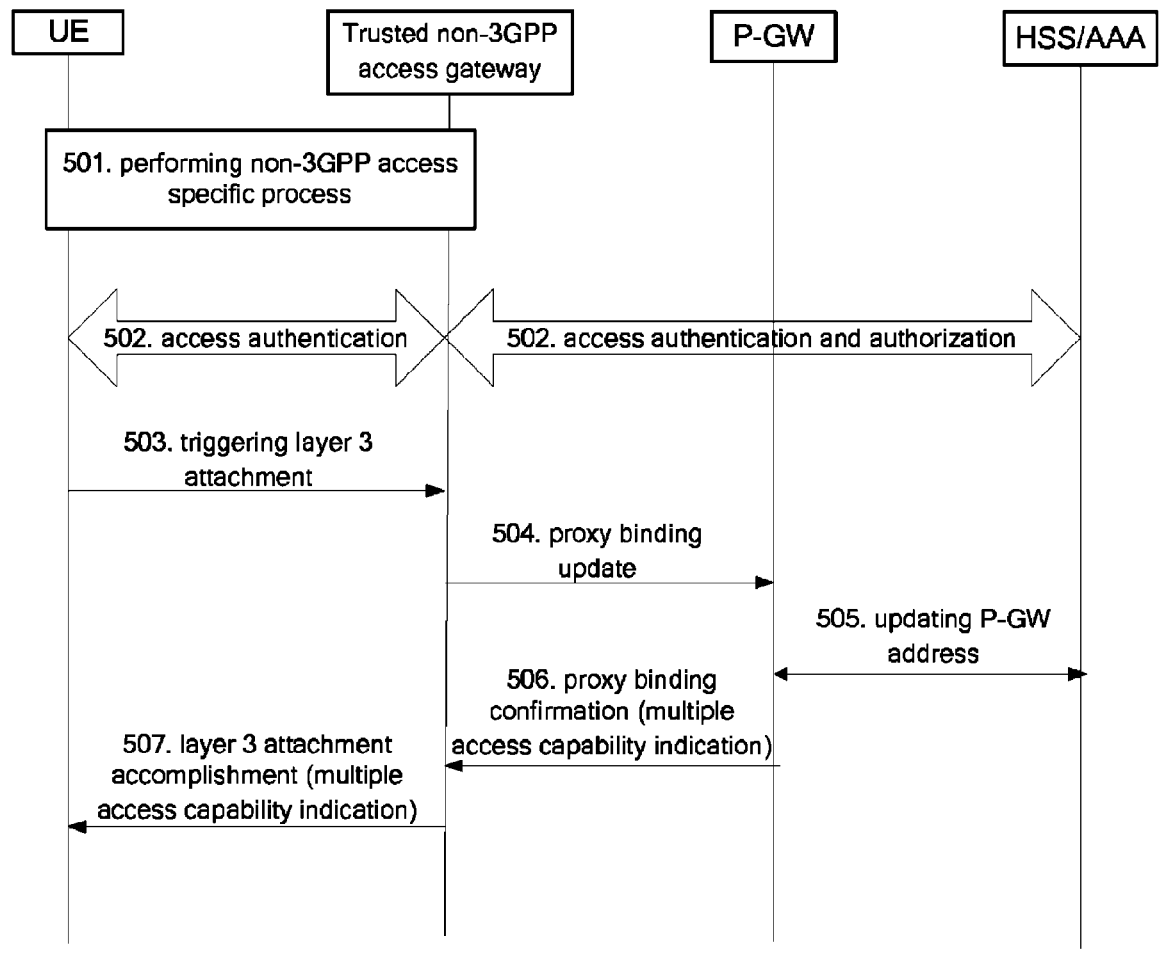
FIG. 5 shows a flow chart of a multiple access method of terminal in EPS when a UE accesses to EPC through a trusted 3GPP access network according to the third embodiment of the invention.

FIG. 5 shows a flow chart of a multiple access method of terminal in EPS when a UE accesses to EPC through a trusted 3GPP access network according to the third embodiment of the invention. In FIG. 5, in this process, a P-GW notifies a UE of its multiple access capability, wherein the P-GW supports a multiple access. As shown in FIG. 5, the multiple access method of terminal in EPS according to the third embodiment of the invention comprises the following steps that:

S501: the specific layer 2 initial access flow of non-3GPP access network is performed;

S502: the EAP authentication process is performed;

S503: after the success of authentication and authorization, the specific layer 3 attachment flow of non-3GPP access is triggered, wherein a trusted non-3GPP access gateway selects a P-GW for the UE access;

S504: the trusted non-3GPP access gateway sends to the selected P-GW a proxy binding updating message;

S505: the P-GW interacts with HSS/AAA and saves its own address information;

S506: the P-GW returns to the trusted non-3GPP access gateway a proxy binding confirmation message in which the IP address allocated by P-GW is carried. Since the P-GW supports a multiple access, the P-GW carries a multiple access capability indication in the returned message;

S507: the trusted non-3GPP IP access gateway returns to the UE a layer 3 attachment accomplishment message in which a multiple access capability indication is carried. The UE knows that P-GW supports a multiple access.

In S503, the UE can carry a multiple access capability indication in the process of performing the specific layer 3 attachment flow of non-3GPP access, to notify the P-GW that the UE supports a multiple access. The P-GW, according to the multiple access capability indication message sent by the UE, determines to carry a multiple access capability indication in S506.

In order to reduce the influence to access network elements as far as possible, the P-GW can package the multiple access capability indication and/or the supported mobility management type indication in PCO to send to the UE, and the UE also can package its multiple access capability indication in PCO to send to the P-GW.

The UE, after knowing that the P-GW supports a multiple access, determines whether or not to initialize a multiple access.

In terms of the multiple access method of terminal in EPS when the UE accesses to EPC through a trusted 3GPP access network according to the third embodiment of the invention, a multiple access capability indication of the P-GW denoting whether or not the P-GW supports a multiple access and a mobility management protocol type supported by the P-GW are sent to the terminal; then a management for the multiple access service of terminal is performed according to the multiple access capability indication, so that the terminal will not send a multiple access request to the P-GW in the condition that the P-GW does not support a multiple access and the UE can know the mobility management protocol type supported by the P-GW, thereby achieving the technical effects of avoiding the waste of network resource and improving the experience of users.

Embodiment 4

Figure 6:
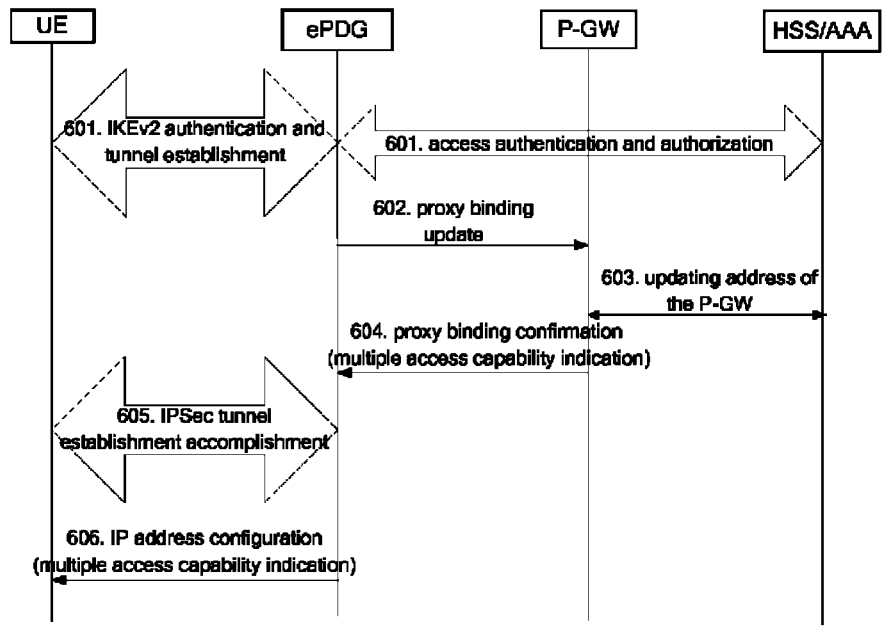
FIG. 6 shows a flow chart of a multiple access method of terminal in EPS when a UE accesses to EPC through an untrusted 3GPP access network according to the fourth embodiment of the invention.

FIG. 6 shows a flow chart of a multiple access method of terminal in EPS when a UE accesses to EPC through an untrusted 3GPP access network according to the fourth embodiment of the invention. In FIG. 6, in this process, a P-GW notifies a UE of its multiple access capability, wherein the P-GW supports a multiple access. As shown in FIG. 6, the multiple access method of terminal in EPS when UE accesses to EPC through an untrusted 3GPP access network according to the fourth embodiment of the invention comprises the following steps that:

S601: the UE, according to IKEv2 protocol, initializes an IPSec tunnel establishment to ePDG which interacts with AAA to accomplish the authentication of Extension Authentication Protocol (EAP);

S602: the ePDG, after selecting the P-GW for the access of the UE, sends a proxy binding updating message to the P-GW;

S603: the P-GW interacts with HSS/AAA and saves its own address information;

S604: the P-GW returns to the ePDG a proxy binding updating confirmation message. Since the P-GW supports a multiple access, the P-GW carries a multiple access capability indication in the returned message;

S605: the IPSec tunnel establishment between the ePDG and the UE is accomplished;

S606: the ePDG configures the IP address of the UE and carries a multiple access capability indication. The UE knows that the P-GW supports a multiple access.

In S601, the UE can carry a multiple access capability indication in the process of performing IPSec tunnel establishment to notify the P-GW that the UE supports a multiple access; the P-GW, according to the multiple access capability indication message sent by the UE, determines to carry a multiple access capability indication in S604.

In order to reduce the influence to access network elements as far as possible, the P-GW can package the multiple access capability indication and/or the supported mobility management type indication in PCO to send to the UE, and the UE also can package its multiple access capability indication in PCO to send to the P-GW. The UE, after knowing that the P-GW supports a multiple access, determines whether or not to initialize a multiple access.

In terms of the multiple access method of terminal in EPS when the UE accesses to EPC through an untrusted 3GPP access network according to the fourth embodiment of the invention, a multiple access capability indication of the P-GW denoting whether or not the P-GW supports a multiple access and a mobility management protocol type supported by the P-GW are sent to the terminal; then a management for the multiple access service of terminal is performed according to the multiple access capability indication, so that the terminal will not send a multiple access request to the P-GW in the condition that the P-GW does not support a multiple access and the UE can know the mobility management protocol type supported by the P-GW, thereby achieving the technical effects of avoiding the waste of network resource and improving the experience of users.

Embodiment 5

Figure 7:
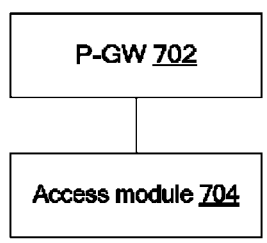
FIG. 7 shows a block diagram of a multiple access system of terminal in EPS according to the fifth embodiment of the invention.

FIG. 7 shows a block diagram of a multiple access system of terminal in EPS according to the fifth embodiment of the invention. As shown in FIG. 7, the multiple access system of terminal in EPS according to the fifth embodiment of the invention comprises: P-GW 702, configured to send a first multiple access capability indication to the terminal and accomplish the multiple access of the terminal, wherein the first multiple access capability indication denotes that the P-GW supports a multiple access; and an access module 704, configured to perform the multiple access according to the first multiple access capability indication.

In the multiple access system of terminal in EPS according to the fifth embodiment of the invention, the P-GW sends a multiple access capability indication denoting that the P-GW supports a multiple access to the terminal. The terminal then, according to the multiple access capability indication, performs the multiple access, so that the terminal will not send a multiple access request to the P-GW in the condition that the P-GW does not support a multiple access, thereby the technical effects of avoiding the waste of network resource and improving the experience of users are achieved.

Preferably, the access module is further configured to send to the P-GW a second multiple access capability indication which denotes that the terminal supports a multiple access. Therefore, the P-GW can know whether or not the terminal supports a multiple access and returns to the terminal its own multiple access capability indication according to whether or not the terminal supports a multiple access, so that both the UE and the P-GW can know each other's multiple access capability.

Preferably, the P-GW is further configured to send to the terminal a mobility management protocol type supported by the P-GW. In the prior art, the UE cannot know the mobility management protocol supported by the P-GW when accessing through 3GPP; UE can know the mobility management protocol supported by the P-GW only when selecting the mobility management protocol after the UE decides to initialize a multiple access. If the capabilities of the UE and the P-GW are different, the UE can only terminate the multiple access flow. Therefore, the process of sending to the terminal the mobility management protocol type supported by the P-GW while sending the multiple access capability indication of the P-GW to the terminal can make the UE know the mobility management protocol supported by the P-GW, thereby avoiding the waste of network resource and improving the experience of users.

Preferably, the first multiple access capability indication and the second multiple access capability indication are packaged in a protocol configuration option to send to the terminal, thereby reducing the influence to access network elements as far as possible.

In the multiple access system of terminal in EPS according to the fifth embodiment of the invention, the P-GW sends to the terminal a multiple access capability indication of the P-GW denoting that the P-GW supports a multiple access and mobility management protocol type supported by the P-GW; then the access module performs the multiple access of terminal according to the multiple access capability indication, so that the terminal will not send a multiple access request to the P-GW in the condition that the P-GW does not support a multiple access and the UE can know the mobility management protocol type supported by the P-GW, thereby achieving the technical effects of avoiding the waste of network resource and improving the experience of users.

By means of at least one technical scheme above according to the invention, a P-GW sends to a terminal a multiple access capability indication denoting that the P-GW supports a multiple access so that the terminal can decide whether or not to initialize a multiple access request according to whether or not the P-GW supports a multiple access, thereby achieving the technical effects of avoiding the waste of network resource and improving the experience of users.

Obviously, those skilled in the art should understand that the modules and steps described above can be implemented by a common computer device. The modules or the steps can be integrated on a single computing device or distributed on a network composed of a plurality of computing devices, and optionally, the modules or the steps can be implemented by a programming code executable by a computing device, thus they can be stored in a storage device to execute by a computing device, or manufactured into individual integrated circuit module respectively, or several of them can be manufactured into a single integrated circuit module to realize. In this way, the present invention is not restricted to any combination of specific hardware and software.

The above is only the preferred embodiment of the invention and not intended to limit the present invention. For those skilled in the art, various modifications and changes can be made to the present invention. Any modification, equivalent substitute and improvement within the spirit and principle of the present invention are deemed to be included within the scope of the present invention.

What is claimed is:

1. A multiple access method of terminal in Evolved Packet System (EPS), comprising:
   sending a first multiple access capability indication to a terminal by a Packet Data Network Gateway (P-GW), wherein the first multiple access capability indication denotes that the P-GW supports a multiple access; and
   performing the multiple access by the terminal according to the multiple access capability indication of the P-GW.

2. The multiple access method according to claim 1, wherein before the step of sending the first multiple access capability indication to the terminal by the P-GW, further comprises:
   sending a second multiple access capability indication to the P-GW by the terminal, wherein the second multiple access capability indication denotes that the terminal supports a multiple access.

3. The multiple access method according to claim 2, wherein the first multiple access capability indication and the second multiple access capability indication are packaged in a protocol configuration option to send to the terminal.

4. The multiple access method according to claim 1, wherein the step of sending the first multiple access capability indication to the terminal by the P-GW specifically comprises:
   sending a bearer establishment request or a proxy binding update to the P-GW by a Serving Gateway (S-GW);
   allocating a network protocol address for the terminal and returning a bearer establishment response or a proxy binding confirmation to the S-GW by the P-GW, wherein the bearer establishment response or the proxy binding confirmation carries the first multiple access capability indication denoting that the P-GW supports the multiple access; and
   forwarding the first multiple access capability indication to the terminal by the S-GW.

5. The multiple access method according to claim 4, wherein the first multiple access capability indication and a second multiple access capability indication are packaged in a protocol configuration option to send to the terminal.

6. The multiple access method according to claim 1, wherein the step of sending the first multiple access capability indication to the terminal by the P-GW comprises:
   sending a proxy binding updating request to the P-GW by a trusted non-3GPP access gateway;
   allocating a network protocol address for the terminal by the P-GW;
   returning, by the P-GW, to the trusted non-3GPP access gateway a proxy binding confirmation that carries the network protocol address of the terminal and the first multiple access capability indication; and
   forwarding the first multiple access capability indication to the terminal by the trusted non-3GPP access gateway.

7. The multiple access method according to claim 6, wherein the first multiple access capability indication and a second multiple access capability indication are packaged in a protocol configuration option to send to the terminal.

8. The multiple access method according to claim 1, wherein the step of sending the first multiple access capability indication to the terminal by the P-GW comprises:
   sending a proxy binding updating request to the P-GW by the Evolved Packet Data Gateway (ePDG);
   allocating a network protocol address for the terminal by the P-GW;
   returning, by the P-GW, to the ePDG a proxy binding confirmation that carries the network protocol address of the terminal and the first multiple access capability indication; and
   forwarding the first multiple access capability indication to the terminal by the ePDG.

9. The multiple access method according to claim 8, wherein the first multiple access capability indication and a second multiple access capability indication are packaged in a protocol configuration option to send to the terminal.

10. The multiple access method according to claim 1, further comprising:
    while sending the first multiple access capability indication to the terminal, sending to the terminal a mobility management protocol type supported by the P-GW.

11. The multiple access method according to claim 10, wherein the first multiple access capability indication and a second multiple access capability indication are packaged in a protocol configuration option to send to the terminal.

12. The multiple access method according to claim 1, further comprising:
    not sending the first multiple access capability indication to a terminal by the P-GW if the P-GW does not support the multiple access; and
    not performing the multiple access by the terminal.

13. The multiple access method according to claim 1, wherein the first multiple access capability indication and the second multiple access capability indication are packaged in a protocol configuration option to send to the terminal.

14. A multiple access system of terminal in Evolved Packet System (EPS), comprising:
    a Packet Data Network Gateway (P-GW), configured to send a first multiple access capability indication to a terminal and accomplish the multiple access of the terminal, wherein the first multiple access capability indication denotes that the P-GW supports a multiple access; and
    an access module, configured to perform the multiple access according to the first multiple access capability indication.

15. The multiple access system according to claim 14, wherein the access module is further configured to send to the P-GW a second multiple access capability indication which denotes that the terminal supports the multiple access.

16. The multiple access system according to claim 15, wherein the first multiple access capability indication and the second multiple access capability indication are packaged in a protocol configuration option to send to the terminal.

17. The multiple access system according to claim 14, wherein the P-GW is further configured to send to the terminal a mobility management protocol type supported by the P-GW.

18. The multiple access system according to claim 17, wherein the first multiple access capability indication and a second multiple access capability indication are packaged in a protocol configuration option to send to the terminal.

19. The multiple access system according to claim 14, wherein the first multiple access capability indication and the second multiple access capability indication are packaged in a protocol configuration option to send to the terminal.

* * * * *